(12) United States Patent
Hoshino et al.

(10) Patent No.: US 7,210,789 B2
(45) Date of Patent: May 1, 2007

(54) LIQUID CRYSTAL DISPLAY DEVICE AND LIQUID CRYSTAL COOLING UNIT

(75) Inventors: Masakazu Hoshino, Chiyoda (JP); Shigeo Ohashi, Tsuchiura (JP); Tatsuo Morita, Tokyo (JP); Katsuyuki Watanabe, Mito (JP)

(73) Assignee: Hitachi, Ltd., Tokyo (JP)

( * ) Notice: Subject to any disclaimer, the term of this patent is extended or adjusted under 35 U.S.C. 154(b) by 315 days.

(21) Appl. No.: 10/919,289

(22) Filed: Aug. 17, 2004

(65) Prior Publication Data
US 2005/0213018 A1    Sep. 29, 2005

(30) Foreign Application Priority Data
Mar. 26, 2004   (JP)   ............... 2004-090804

(51) Int. Cl.
G03B 21/16   (2006.01)
G03B 21/18   (2006.01)
G03B 21/26   (2006.01)

(52) U.S. Cl. .......................................... 353/54; 353/52
(58) Field of Classification Search .................. 353/52, 353/54, 60; 349/161
See application file for complete search history.

(56) References Cited

U.S. PATENT DOCUMENTS 5,170,195 A * 12/1992 Akiyama et al. ............. 353/54
6,935,753 B2 * 8/2005 Takezawa et al. ............ 353/119
2003/0098944 A1 * 5/2003 Numata et al. ............... 349/161
2005/0007556 A1 * 1/2005 Yanagisawa ................... 353/31

FOREIGN PATENT DOCUMENTS

| JP | 2000-206507 | 7/2000 |
|---|---|---|
| JP | 2002-296565 | 10/2002 |
| JP | 2002-357803 | 12/2002 |

* cited by examiner

*Primary Examiner*—Melissa Jan Koval
*Assistant Examiner*—Andrew Kong
(74) *Attorney, Agent, or Firm*—Antonelli, Terry, Stout & Kraus, LLP.

(57) ABSTRACT

A liquid crystal display device in which light from a light source enters a liquid crystal panel and exits therefrom for projection of an image and includes a heat conducting member and a cooling unit. The heat conducting member is contacted with at least one of a light incident surface and a light outgoing surface of the liquid crystal panel, is light-transmissive, and has a larger area than a light transmitting area of the liquid crystal panel. The cooling jacket, which comprises a flow channel for a cooling medium in its inside, is provided around the heat conducting member so that the flow channel exists only outside of the light transmitting area in a surface direction of the liquid crystal panel.

15 Claims, 12 Drawing Sheets

FLOW CHANNEL

LIGHT INCIDENT SIDE

LIGHT OUTGOING SIDE

FLOW OF COOLANT

LIGHT TRANSMITTING AREA

FLOW OF COOLANT

LIQUID CRYSTAL DISPLAY DEVICE AND LIQUID CRYSTAL COOLING UNIT

BACKGROUND OF THE INVENTION

1. Field of the Invention

The present invention relates to a liquid crystal display device for projecting an image on a screen using a light valve element such as a liquid crystal panel module, and more particularly to a cooling technique for the liquid crystal panel module, a polarizing plate (a plate with a polarizing film), etc.

2. Description of the Prior Art

In a liquid crystal display device, room air outside the device is used for its internal cooling.

In the case of a conventional cooling method of directly blowing air to a liquid crystal panel module, dust floating in the air, cigarette smoke, and the like are stuck to a surface of the liquid crystal panel module when operated for a long stretch of time. The dust and the like sticking to the liquid crystal panel module may interrupt a pixel thereof because the size of the pixel is small (e.g. 10 to 30 µm square). If an image is projected in this state, the dust will be transcribed in the image as a shadow, as it is.

In other words, a projection lens is in focus on the liquid crystal panel module portion and accordingly, not only the image displayed on this liquid crystal panel module but also the dust or the like sticking in the vicinity thereof become the shadow in the projected image. Although the size and the location (the distance from the focal plane) of the dust actually affecting vary according to the F value of the projection lens, it is necessary to prevent the dust from sticking to the vicinities of the liquid crystal panel module, at any rate.

Further, the size of the liquid crystal panel module has been increasingly reduced for cost saving, and now, a liquid crystal panel module of 0.5 inch size comes into use, so that the heating density in the liquid crystal panel module becomes high.

Furthermore, in order to enlarge the area of the projected screen and to improve luminance thereof, the intensity of incident light on the liquid crystal panel module tends to be increased more and more, resulting in a rise in heating value. Accordingly, a raise in temperature of the liquid crystal panel module and of a polarizing film (plate) arranged in front and back of the liquid crystal panel module falls to be a problem, so that it is required to improve the cooling capacity of the liquid crystal panel module portion.

To meet this requirement, in JP-A-2002-357803 and JP-A-2002-296565 for instance, a cooling medium such as water is sealed or circulated in a light transmitting area of the liquid crystal panel module and the polarizing plate to improve the cooling capacity. However, in the case of this cooling method, since the light is transmitted through the cooling medium such as water, a distribution is generated in the refraction index due to density variation or flow velocity distribution caused by temperature distribution of the cooling medium, to cause a problem that the image is fluctuated, or distorted.

Further, in JP-A-2000-206507, heat radiation is improved by making the substrate material of the polarizing plate of sapphire having high thermal conductivity, so as to address the high-luminance liquid crystal display device. However, since this is a method of directly blowing air on the liquid crystal panel module and the polarizing plate to cool those, there has been a problem that the dust and the cigarette smoke contained in the cooling air stick to the surfaces of the liquid crystal panel module and the polarizing plate to deteriorate the image quality.

BRIEF SUMMARY OF THE INVENTION

As described above, the prior art has problems to be solved as follows.

That is, when a liquid crystal display device is enhanced in luminance and reduced in size, the quantity and density of heat generated by a liquid crystal panel module and a polarizing plate are increased. In order to cool those with air, it is necessary to enlarge a cooling fan, or rotate the fan faster to increase the flow velocity (flow rate). However, in any case, the noise of the cooling fan becomes louder.

Further, cigarette smoke and/or dust contained in the cooling air stick to surfaces of the liquid crystal panel module and the polarizing plate to cause fluctuation and defocusing of the image.

Further, in the case of a method of directly cooling the liquid crystal panel module or the polarizing plate with liquid, although the cooling capability is high, a distribution is generated in the refraction index due to density variation or flow velocity distribution caused by temperature distribution of the liquid, to cause a problem that the image is fluctuated, or distorted.

However, even in this case, in the case that the liquid is water for example, if the thickness of the liquid layer is made 0.5 mm or less, it is considered that the above-problems do not occur. However, when trying to let the liquid flow through the gap of 0.5 mm at a flow rate necessary for the cooling, it may not be achieved because a high pressure pump is required due to very high fluid resistance.

An object of the present invention is to propose a liquid crystal display device and a liquid crystal cooling unit which achieve low noise and have high cooling capability, without directly blowing air on the liquid crystal panel module and the polarizing plate.

The above object is achieved by a liquid crystal display device in which light from a light source enters a liquid crystal panel module through a lens and an incident side polarizing plate, and an image is projected on a screen via the outgoing side polarizing plate, and in which a light-transmissive heat conducting member larger than a light transmitting area of a liquid crystal panel is contacted with at least one of a light incident surface and a light outgoing surface of the liquid crystal panel, and a cooling jacket having a cooling medium flow channel in its inside is provided around the heat conducting member.

Further, the above object is achieved by a liquid crystal display device in which light from a light source enters a liquid crystal panel module through a lens and an incident side polarizing plate, and an image is projected on a screen via a light outgoing side polarizing plate, including a cooling jacket in which a light-transmissive, heat conducting member which is larger than a light transmitting area of a liquid crystal panel and has a channel in its inside for letting a cooling medium flow around an area other than the light transmitting area is contacted with at least one of a light incident surface and a light outgoing surface of the liquid crystal panel.

Further, the above object is achieved by connecting a pump by means of piping for circulating the cooling medium between the cooling jacket and a heat radiator portion to cool the heat radiator portion.

Further, the above object is achieved by a liquid crystal cooling unit to be attached to a liquid crystal display device in which light from a light source enters a liquid crystal panel module through a lens and an incident side polarizing plate, and an image is projected on a screen via a light outgoing side polarizing plate, wherein a light-transmissive, heat conducting member larger than a light transmitting area of a liquid crystal panel is contacted with at least one of a light incident surface and a light outgoing surface of the liquid crystal panel, the liquid crystal cooling unit having a flow channel for a cooling medium in its inside around the heat conducting member, a plurality of cooling fins being formed around an area other than the light transmitting area.

Further, the above object is achieved by adding a polarizing film to a surface of the heat conducting member.

Further, the above object is achieved by adhering the cooling jacket and the heat conducting member to each other with an adhesive having high thermal conductivity.

Further, the above object is achieved by the cooling jacket and the heat conducting member which is contacted with each other with a highly heat-conducting substance layer disposed therebetween.

Further, the above object is achieved by the highly heat-conducting substance layer made of silicon grease, a carbon sheet or the like.

Further, the above object is achieved by letting light-transmissive and highly heat-conducting liquid, solid or gel-like substance intervene in a contact portion between the liquid crystal panel and the heat conducting member.

Further, the above object is achieved by the highly heat-conducting liquid, solid or gel-like substance made of silicon oil, silicon grease, water, water-containing liquid or a mixture thereof, or a transparent plastic.

Further, the above object is achieved by the heat conducting member made of sapphire or quartz.

Further, the above object is achieved by the cooling jacket being made of aluminum or copper.

According to the invention, it is possible to efficiently cool the heat generated by the liquid crystal panel module and the polarizing film. Thus, the liquid crystal display device is enhanced in luminance and reduced in size and noise, and in addition, improved in reliability.

Other objects, features, and advantages of the invention will become apparent from the following description of embodiments of the invention taken in conjunction with the accompanying drawings.

DETAILED DESCRIPTION OF THE INVENTION

The preferred embodiments of the present invention will be described with reference to the accompanying drawings.

Embodiment 1

Figure 1:
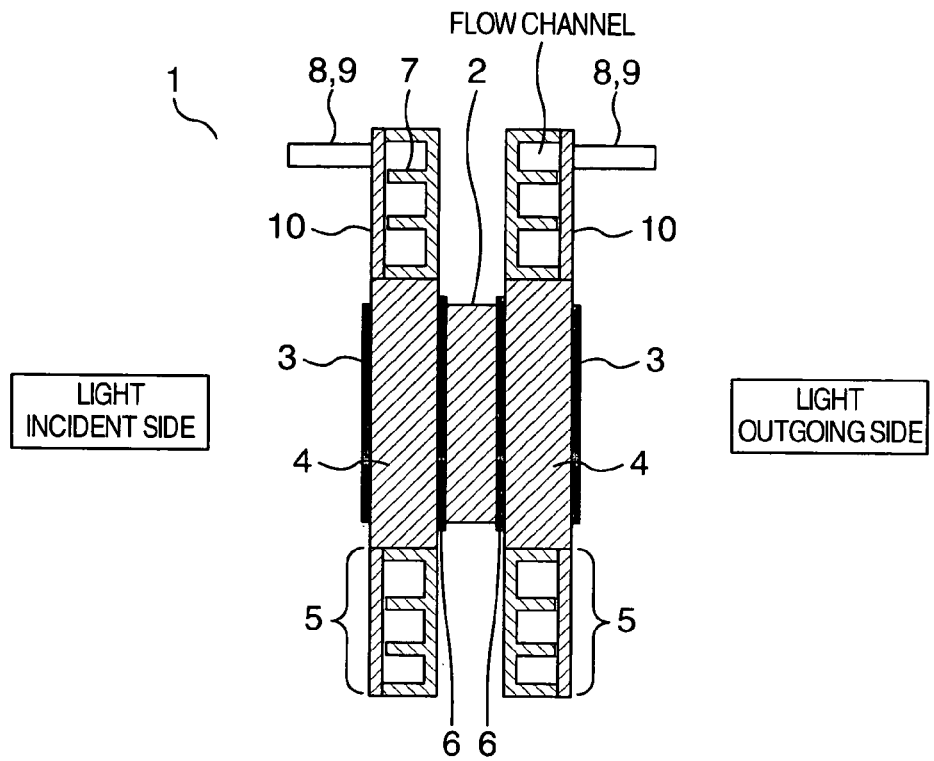
FIG. 1 is a vertical section showing a configurgation of a liquid crystal cooling unit according to Embodiment 1 of the invention.
Figure 2:
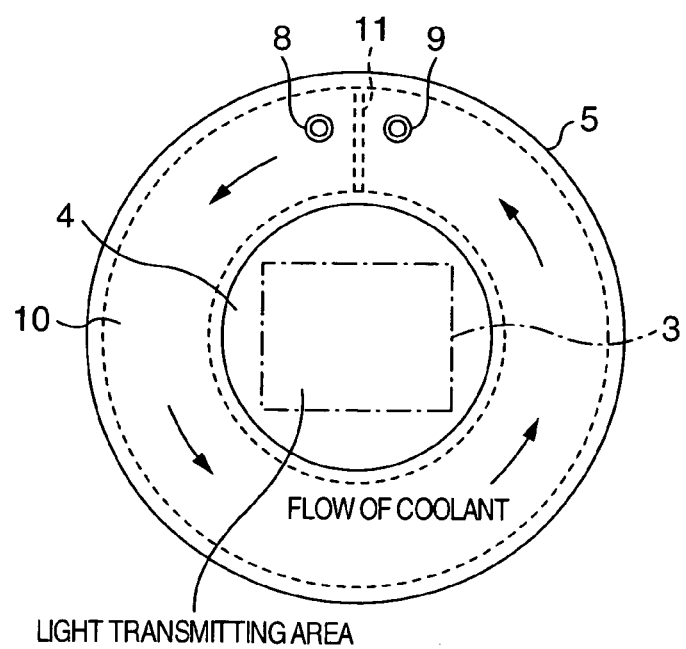
FIG. 2 is a side view of the liquid crystal cooling unit according to Embodiment 1 shown in FIG. 1.

FIGS. 1 and 2 illustrate the structure of a liquid crystal cooling unit 1 according to Embodiment 1.

FIG. 1 is a vertical section of the liquid crystal cooling unit 1 according to Embodiment 1.

FIG. 2 shows a side view of FIG. 1.

Figure 3:
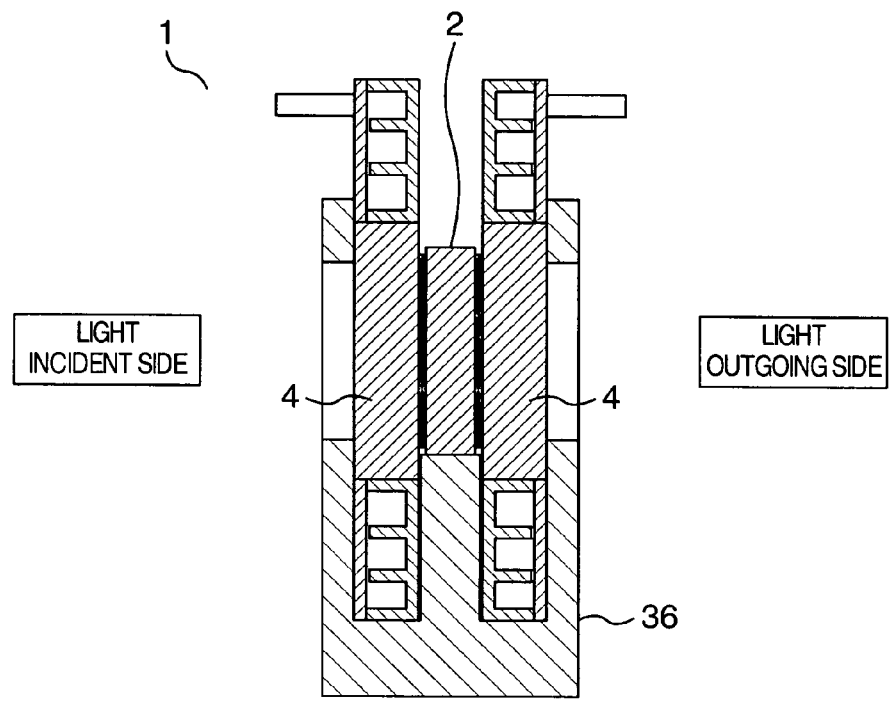
FIG. 3 is an assembled vertical section of the liquid crystal cooling unit according to Embodiment 1 shown in FIG. 1.
Figure 4:
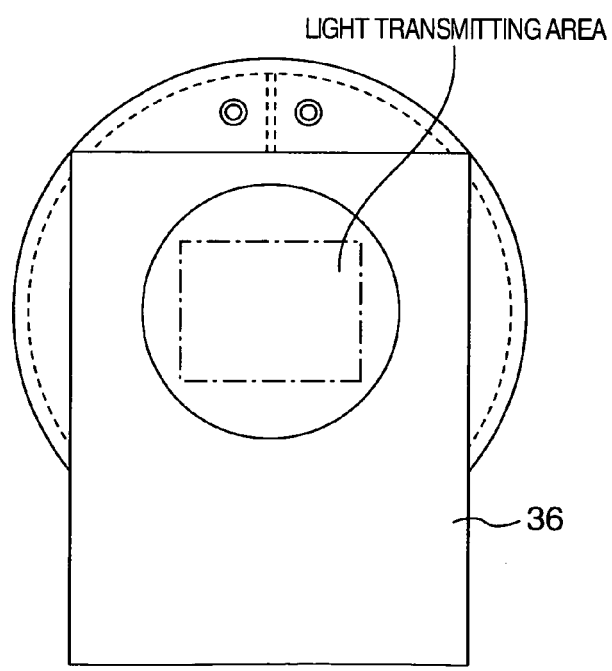
FIG. 4 is an assembled side view of the liquid crystal cooling unit according to Embodiment 1 shown in FIG. 1.

FIGS. 3 and 4 show an assembled state of the liquid crystal cooling unit 1.

Figure 5:
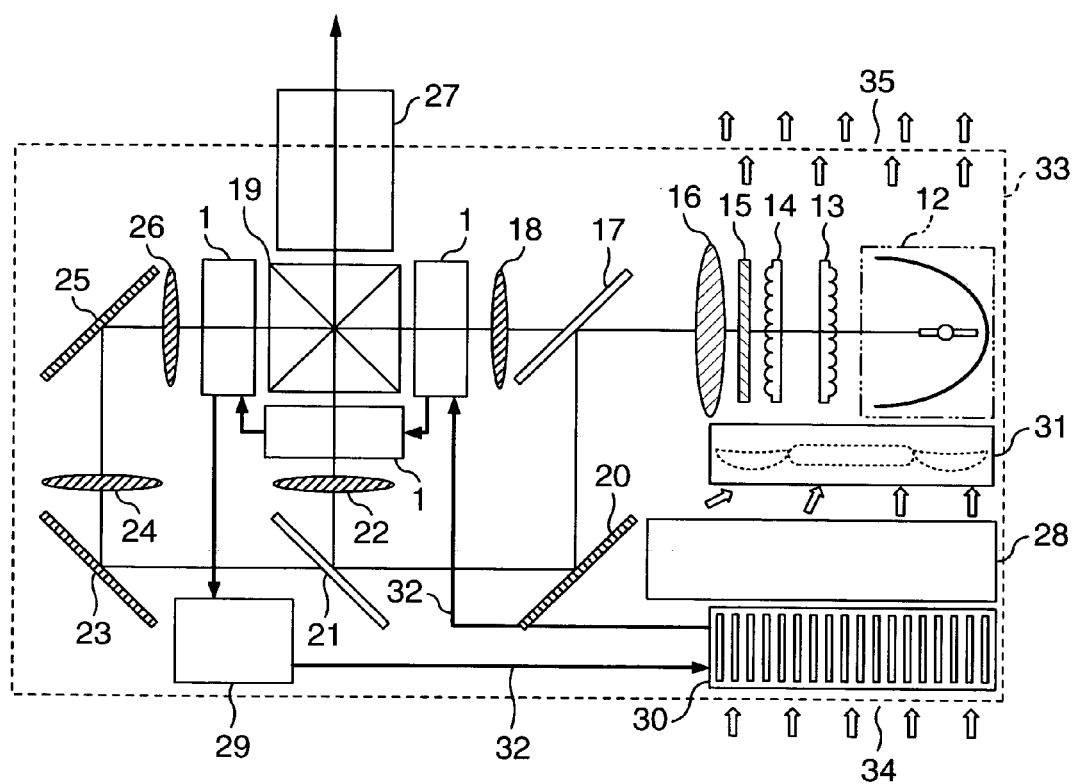
FIG. 5 illustrates the configuration of a liquid crystal display device using the liquid crystal cooling unit according to Embodiment 1.

FIG. 5 illustrates a configuration of a liquid crystal projector in which the liquid crystal cooling unit 1 is installed.

As shown in FIGS. 1 and 2, the liquid crystal cooling unit 1 according to Embodiment 1 comprises a liquid crystal panel module 2, sapphire plates 4 each of which is coated with a polarizing film 3 or to which the polarizing film 3 is adhered, cooling jackets 5 (made of aluminum for instance) having a ring-shaped internal channel, and a light-transmissive, highly heat-conducting substance layer 6 (which is preferably made of a gel-like material such as non-adhesive silicon gel, silicon oil or silicon grease, for instance) for facilitating heat conduction between the sapphire plates 4 and the liquid crystal panel module 2.

The cooling jackets 5 comprise radiator fins 7, inlets 8 and outlets 9 for respectively letting a cooling medium (e.g. water) into and out of the ring-shaped internal channel, lid plates 10 for forming the ring-shaped internal channel, and a partitioning board 11 (shown in FIG. 2) for causing the cooling medium to flow from the inlets 8 to the outlets 9 so as to describe a circle. This embodiment has the structure in which the sapphire plates 4 and the cooling jackets 5 are adhered to each other with an adhesive having high thermal conductivity.

As shown in FIGS. 3 and 4, the liquid crystal cooling unit 1 is assembled by positioning gaps between the sapphire plates 4 and the liquid crystal panel module 2, the height of the optical axis, and the like by a holding part 36 having a bore hole slightly larger than the light transmitting area. In this state, the unit is incorporated into a liquid crystal projector or the like.

Although the cooling medium flows so as to make a circuit of the sapphire plates 4 in this embodiment, the invention is not limited thereto, but the structure may be made so as to allow the cooling medium to flow partially due to a problem of a spacer, or so as to allow the cooling medium to flow by dividing the flow channel. Also, although the sapphire plates 4 are formed in disk-shape in view of the facility in machining, the shape is not limited thereto, but it may be formed in rectangular or in other modified shapes.

While the thickness of the sapphire plate 4 on the light incident side and that of the sapphire plate 4 on the light outgoing side are not particularly limited, it is preferable, in view of cooling, that the sapphire plate 4 on the light outgoing side is thicker than the sapphire plate 4 on the light incident side because the polarizing film 3 on the light outgoing side usually generates more heat than the polarizing film 3 on the light incident side. The proper thickness of the sapphire plates 4 is roughly between 1 mm and 10 mm, while it may vary according to the calorific value generated by the liquid crystal panel module 2 or the polarizing film 3. Needless to say, it is preferable that the thickness of the light-transmissive highly heat-conducting substance layer 6 is thin as much as possible.

The reasons why the liquid crystal panel module 2 and the sapphire plates 4 are not put together in an adhered structure are that: (1) the adhesion which involves the setting of the adhesive causes stress and distortion due to differences in the coefficient of thermal expansion and Young's modulus, thereby a cell gap thickness of the liquid crystal panel module 2 changes to generate color shading; and (2) the maintenance facility in replacing the liquid crystal panel module 2 and in fine-adjustment of the position is improved.

When coating the sapphire plates 4 with the polarizing film or sticking the film to the plates, it is necessary to fully pay attention to the crystal axis of the sapphire plate 4 and the polarizing direction of the polarizing film 3 so that the polarizing characteristic of the polarizing film 3 is not adversely affected. Similarly, when combining the sapphire plates 4 and the liquid crystal panel module 2, it is necessary to fully pay attention to the crystal axis of the sapphire plate 4 and the transmitting direction of the liquid crystal panel module 2 so that the polarizing characteristic is not adversely affected.

If red light enters the liquid crystal cooling unit 1 from the light incident side in FIG. 1 for instance, the red light is, firstly, converted into heat by the polarizing film 3 since the red light which does not correspond to the polarizing direction of the polarizing film 3 cannot be transmitted through the polarizing film 3 on the light incident side. The red light which has been transmitted through the polarizing film 3 is transmitted through the sapphire plates 4 and the light-transmissive highly heat-conducting substance layer 6 to enter the liquid crystal panel module 2. Among the red lights which have been transmitted through the liquid crystal panel module 2 and the sapphire plates 4, only the red light corresponding to the polarizing direction of the polarizing film 3 on the light outgoing side is transmitted, and the other lights are converted into heat by the polarizing film 3. Also, heat is generated in the sapphire plates 4 and the light-transmissive highly heat-conducting substance layer 6 as well due to incident loss and outgoing loss (a few percent or so of the incident light) of the red light.

Since the liquid crystal of the liquid crystal panel module 2 and the polarizing film 3 include an organic substance, the optical characteristics thereof are abruptly deteriorated if the temperature is beyond about 70 to 80° C. to cause shortening of life. Therefore, the cooling of the liquid crystal cooling unit 1 should be always controlled to keep it below the above temperature.

Next, the cooling mechanism for the liquid crystal panel module 2 and the polarizing film 3 of the liquid crystal cooling unit 1 will be described.

While details will be described below with reference to the overall configuration of the liquid crystal display device to which this liquid crystal cooling unit 1 is applied, since a cooling medium is flowing in the ring-shaped internal channel of the cooling jackets 5, the cooling jackets 5 cooled by the cooling medium are kept at a lower temperature in comparison with the liquid crystal panel module 2 and the polarizing film 3. For this reason, the heat generated by the polarizing film 3 is conducted by the sapphire plates 4 having a high thermal conductivity (about 40 W/(m·K)) and the cooling jackets 5 to the cooling medium.

Similarly, the heat generated by the liquid crystal panel module 2 is conducted by the light-transmissive highly heat-conducting substance layer 6, the sapphire plates 4 and the cooling jackets 5, and also conveyed to the cooling medium. Therefore, the heat generated by the liquid crystal panel module 2 and the polarizing film 3 is cooled by the cooling medium.

The temperatures of the liquid crystal panel module 2 and the polarizing film 3 are regulated to a desired level by controlling the flow velocity of the cooling medium and the intensity of the incident light.

Next, with reference to FIG. 5, the overall configuration of the liquid crystal display device using such a liquid crystal cooling unit 1 will be described.

White light from a light source 12 passes a first lens array 13, a the second lens array 14, a the polarizing beam splitter 15 and a collective lens 16, and is split into blue light and red-plus-green light by a dichroic mirror 17. The blue light resulting from the split passes a condenser lens 18 and the liquid crystal cooling unit 1 shown in FIG. 1, and enters a color synthesizing prism 19.

The red-plus-green light resulting from the split passes a reflector 20, and is split into red light and green light by a dichroic mirror 21. The green light resulting from this split passes a condenser lens 22 and the other liquid crystal cooling unit 1, and enters the color synthesizing prism 19. The red light resulting from the split passes a reflector 23, a relay lens 24, a reflector 25, a condenser lens 26 and the still other liquid crystal cooling unit 1, and enters the color synthesizing prism 19. The red, blue and green lights having entered the color synthesizing prism 19 are synthesized, and the synthesized light is projected on a screen via a projection lens 27, so that a desired image is realized.

Main parts, which generate heat when the liquid crystal display device is operated, are the light source 12, an electrical component unit 28 and the three liquid crystal cooling units 1 as stated above. Needless to say, the heat is also generated in dichroic mirrors and reflectors, which transmit or reflect the light.

Next, the cooling structure and method for the liquid crystal display device of Embodiment 1 will be described.

The liquid crystal cooling units 1, a pump 29 and a heat radiator unit 30 are piped in the following order of: the liquid crystal cooling unit 1 for blue, the liquid crystal cooling unit 1 for green, the liquid crystal cooling unit 1 for red, the pump 29, the heat radiator unit 30, and the liquid crystal cooling unit 1 for blue. There is further provided an air cooling fan 31 for forced air cooling of the heat from the light source 12, the electrical component unit 28 and the heat radiator unit 30.

When the liquid crystal display device is operated, the heat is generated from the polarizing films 3 and the liquid crystal panel modules 2 of the three liquid crystal cooling units 1 as described above. Since the cooling medium is forcibly caused to flow in the channel of the cooling jacket of the liquid crystal cooling unit 1 by the pump 29, the heat is transmitted from the inner surface of the cooling jacket 5 of each liquid crystal cooling unit 1 to the cooling medium, so that the temperature of the cooling medium is raised. This warm cooling medium is conveyed to the heat radiator unit 30 by the pump 29 and piping 32.

If the air cooling fan 31 is operating here, air in the room flows through an intake 34 provided in a case 33 and, after flowing between a plurality of fins in the heat radiator unit 30, passes the light source 12 via the electrical component unit 28 and the air cooling fan 31, so that the air is eventually discharged through a discharge port 35 provided in the case 33. Since the heat of the cooling medium thereby transmitted to the heat radiator unit 30 is further transmitted to cooling air from the outer surface of the heat radiator unit 30, the temperature of the cooling medium is decreased, and the cooling medium which has been reduced in temperature returns to the liquid crystal cooling units 1. By circulating the cooling medium in this manner, the temperature of the liquid crystal cooling units 1 can be kept so as not to exceed a permissible upper limit. At the same time, the electrical component unit 28 and the light source 12 are cooled mainly by forced convective heat transmission.

The reason why the heat radiator unit 30, the electrical component unit 28 and the light source 12 are arranged so that the cooling air flows therethrough in this order is for cooling the light source 12 having the hottest heat radiating part while the calorific value which can be cooled by heat transmission is proportional to the temperature difference between the cooling air and the surface of each component.

As described above, the liquid crystal display device of Embodiment 1 brings about effects of achieving low noise, small size and high luminance because the liquid crystal panel module 2, the polarizing films 3 on the light incident side and the polarizing films 3 on the light outgoing side of the three liquid crystal cooling units 1 are efficiently cooled with the single air cooling fan 31.

Embodiment 2

Figure 6:
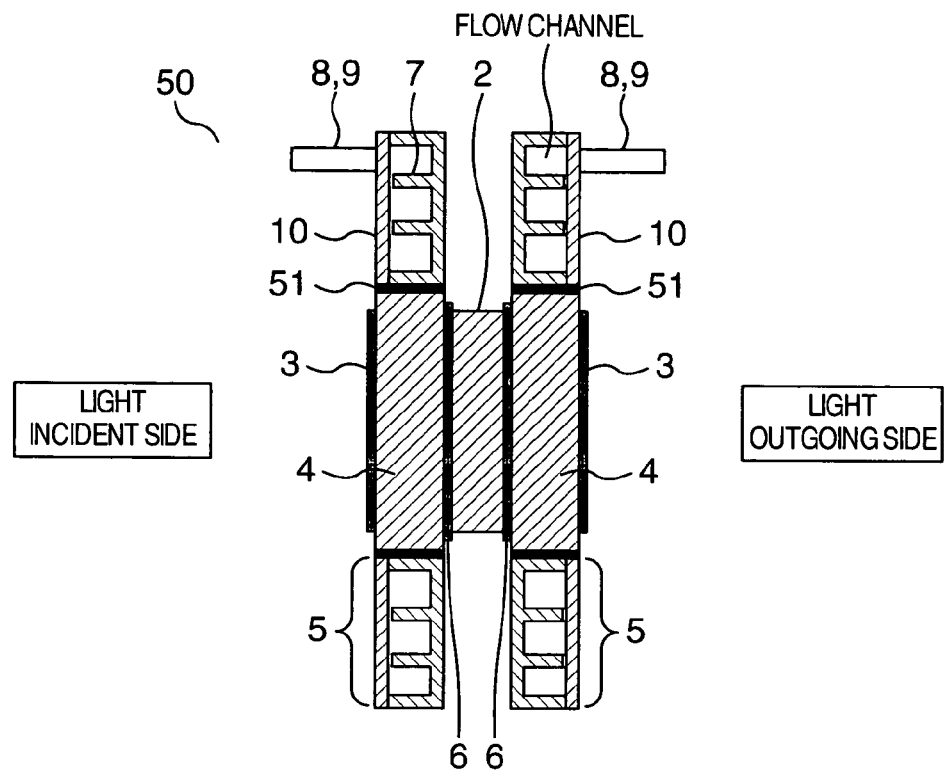
FIG. 6 is a vertical section showing a configuration of a liquid crystal cooling unit according to Embodiment 2.
Figure 7:
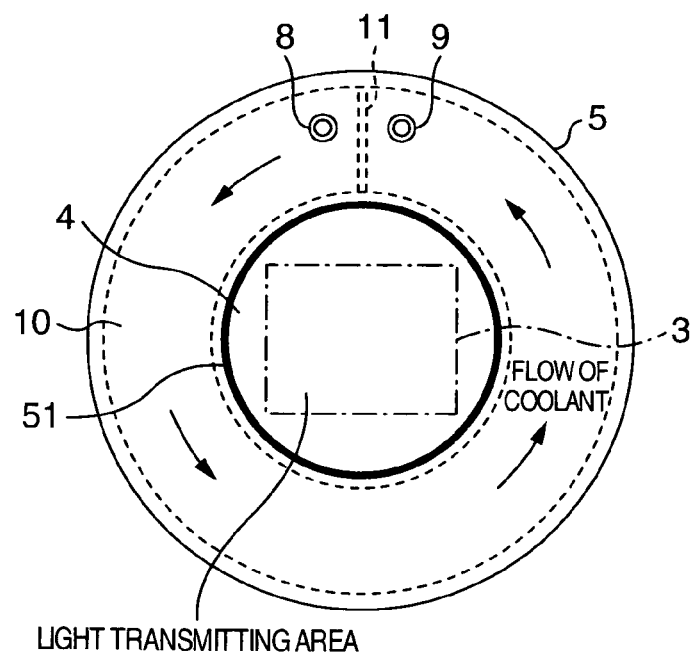
FIG. 7 is a side view of the liquid crystal cooling unit according to Embodiment 2 shown in FIG. 6.

FIGS. 6 and 7 illustrate the structure of a liquid crystal cooling unit 50 equipped with Embodiment 2.

FIG. 6 shows a vertical section of the liquid crystal cooling unit 50, and FIG. 7 is a side view of the unit shown in FIG. 6.

The liquid crystal cooling unit 50 of Embodiment 2 is composed of the liquid crystal panel module 2, the sapphire plates 4 each coated with the polarizing film 3 or to which the polarizing film 3 is adhered, the cooling jackets 5 (made of aluminum for instance) having a ring-shaped internal channel, a light-transmissive, highly heat-conducting substance layer 51 for facilitating heat conduction between the sapphire plates 4 and the cooling jackets 5, and the light-transmissive, highly heat-conducting substance layer 6 (made of silicon grease for instance) for facilitating heat conduction between the sapphire plates 4 and the liquid crystal panel module 2. The cooling jackets 5 are provided with the radiator fins 7, and the inlets 8 and the outlets 9 for respectively introducing and discharging a cooling medium (e.g. water) into and from the ring-shaped internal channel. This ring-shaped internal channel is provided with the lid plates 10 and the partitioning board 11 (shown in FIG. 11) for causing the cooling medium to flow to make a circuit thereof, from the inlets 8 to the outlets 9.

This embodiment has structure in which the sapphire plates 4 and the cooling jackets 5 are in contact with each other via the highly heat-conducting substance layer 51 (ring-shaped in the example shown in FIG. 7).

When coating the sapphire plate 4 with the polarizing film 3, or adhering the polarizing film 3 thereto, it is necessary to pay attention to the crystal axis of the sapphire plate 4 and the polarizing direction of the polarizing film 3 so as not to adversely affect the polarizing characteristic of the polarizing film 3. Similarly, when combining the sapphire plates 4 and the liquid crystal panel module 2, it is also necessary to pay attention to the crystal axis of the sapphire plate 4 and the transmitting direction of the liquid crystal panel module 2 so that the polarizing characteristic is not adversely affected. Further, the proper thickness of the sapphire plate 4 is about from 1 mm to 10 mm, while it varies according to the calorific value generated by the liquid crystal panel module 2 or the polarizing film 3. With respect to the thicknesses of the highly heat-conducting substance layer 51 and the light-transmissive highly heat-conducting substance layer 6, needless to say, it is preferable that it is thin as much as possible, in view of promotion of heat conduction.

When red light enters the liquid crystal cooling unit 50 from the light incident side in FIG. 6 for instance, firstly, a part of the red light which is inconsistent with the polarizing direction of the polarizing film 3 cannot be transmitted through the polarizing film 3 on the light incident side, while it is converted into heat by the polarizing film 3. The rest part of the red light transmitted through the polarizing film 3 is transmitted through the sapphire plates 4 and the light-transmissive highly heat-conducting substance layer 6, and enters the liquid crystal panel module 2. Among the part of the red light transmitted through the liquid crystal panel module 2 and the sapphire plates 4, only a part of the red light corresponding to the polarizing direction of the polarizing film 3 on the light outgoing side is transmitted though there, and the rest part is converted into heat by the polarizing film 3. Also, heat is generated in the sapphire plates 4 and the light-transmissive highly heat-conducting substance layer 6 as well due to incident loss and outgoing loss (a few percent or so of the incident light) of the red light.

Since the liquid crystal of the liquid crystal panel module 2 and the polarizing film 3 include an organic substance, the optical characteristics thereof are abruptly deteriorated if the temperature is beyond about 70 to 80° C. to cause shortening of life. Therefore, the cooling of the liquid crystal cooling unit 50 should be always controlled to keep it below the above temperature.

Next, the cooling mechanism for the liquid crystal panel module 2 and the polarizing film 3 of the liquid crystal cooling unit 50 will be described.

Since a cooling medium is flowing in the ring-shaped internal channel of the cooling jackets 5, the cooling jackets 5 cooled by the cooling medium are kept at a lower temperature than the liquid crystal panel module 2 and the polarizing films 3. For this reason, the heat generated by the polarizing films 3 is conducted by the sapphire plates 4 having a high thermal conductivity (about 40 W/(m·K)), the highly heat-conducting substance layer 51 and the cooling jackets 5, to the cooling medium. Similarly, the heat generated by the liquid crystal panel module 2 is conducted by the light-transmissive highly heat-conducting substance layer 6, the sapphire plates 4, the highly heat-conducting substance layer 51 and the cooling jackets 5, and also conveyed to the cooling medium. Therefore, the heat generated by the liquid crystal panel module 2 and the polarizing films 3 is cooled by the cooling medium.

The temperatures of the liquid crystal panel module 2 and the polarizing films 3 are regulated to a desired level by controlling the flow velocity of the cooling medium and the intensity of the incident light.

Because the method of cooling the liquid crystal display device of the liquid crystal cooling unit 50 of Embodiment 2 is similar to that of Embodiment 1, the description therefor is omitted here.

As described above, the liquid crystal display device of Embodiment 2 brings about effects of achieving low noise, small size and high luminance because the liquid crystal panel module 2, the polarizing films 3 on the light incident side and the polarizing films 3 on the light outgoing side of the three liquid crystal cooling units 50 are efficiently cooled with the single air cooling fan 31.

Embodiment 3

Figure 8:
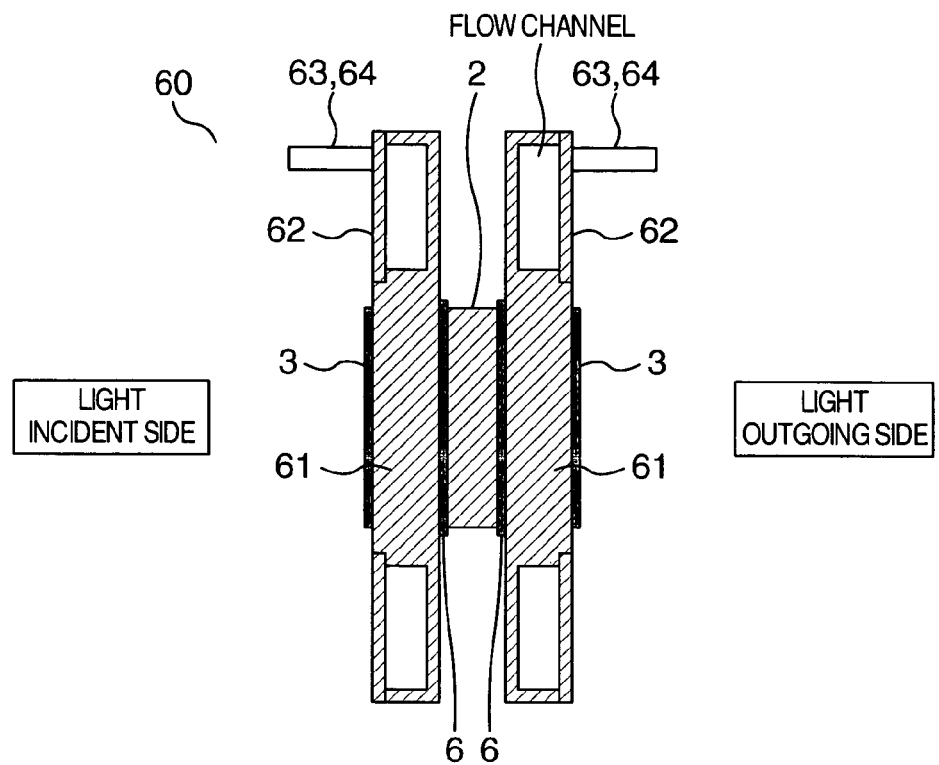
FIG. 8 is a vertical section showing a configuration of a liquid crystal cooling unit according to Embodiment 3.
Figure 9:
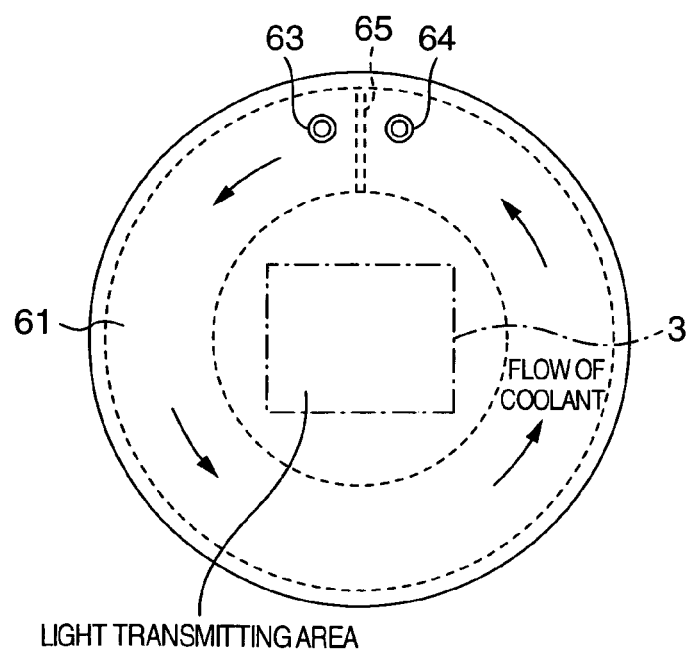
FIG. 9 is a side view of the liquid crystal cooling unit according to Embodiment 3 shown in FIG. 8.

FIGS. 8 and 9 illustrate the structure of a liquid crystal cooling unit 60 of Embodiment 3.

FIG. 8 shows a vertical section of the liquid crystal cooling unit 60.

FIG. 9 is a side view of the unit shown in FIG. 8.

The liquid crystal cooling unit 60 of Embodiment 3 is composed of the liquid crystal panel module 2, the sapphire plates 61 which have a ring-shaped internal channel outside a light transmitting area and are coated with the polarizing film 3, or to which the polarizing film 3 is adhered in the light transmitting area, and the light-transmissive highly heat-conducting substance layer 6 (made of silicon grease for instance) for facilitating heat conduction between the sapphire plates 61 and the liquid crystal panel module 2. Each of the sapphire plates 61 is consist of a lid plate 62 for forming the channel, an inlet 63 and an outlet 64 for introducing and discharging, respectively, a cooling medium (e.g. water) into and from the ring-shaped channel, and a partitioning board 65 (shown in FIG. 9) for causing the cooling medium to flow from an inlet 63 to an outlet 64.

When coating the sapphire plate 61 with the polarizing film 3 or adhering the polarizing film 3 thereto, it is necessary to pay attention to the crystal axis of the sapphire plate 61 and the polarizing direction of the polarizing film 3 so as not to adversely affect the polarizing characteristic of the polarizing film 3. Similarly, when combining the sapphire plates 61 and the liquid crystal panel module 2, it is necessary to pay attention to the crystal axis of the sapphire plate 61 and the transmitting direction of the liquid crystal panel module 2 so that the polarizing characteristic is not adversely affected. Further, the proper thickness of the sapphire plate 61 is about from 1 mm to 10 mm, while it varies according to the calorific value generated by the liquid crystal panel module 2 or the polarizing film 3. With respect to the thicknesses of the light-transmissive highly heat-conducting substance layer 6, needless to say, it is preferable that it is thin as much as possible in view of promotion of heat conduction.

When red light enters the liquid crystal cooling unit 60 from the light incident side in FIG. 8 for instance, firstly, a part of the red light which is inconsistent with the polarizing direction of the polarizing films 3 cannot be transmitted through the polarizing films 3 on the light incident side, while it is converted into heat by the polarizing films 3. The rest part of the red light transmitted through the polarizing films 3 is transmitted through the sapphire plates 61 and the light-transmissive highly heat-conducting substance layer 6, and enters the liquid crystal panel module 2. Among the part of the red light transmitted through the liquid crystal panel module 2 and the sapphire plates 61, only a part of the red light corresponding to the polarizing direction of the polarizing films 3 on the light outgoing side is transmitted, and the rest part is converted by the polarizing films 3 into heat. Also, heat is generated in the sapphire plates 61 and the light-transmissive. highly heat-conducting substance layer 6 as well, due to incident loss and outgoing loss (a few percent or so of the incident light) of the red light.

Since liquid crystals of the liquid crystal panel module 2 and the polarizing films 3 include an organic substance, their optical characteristics are abruptly deteriorated if the temperature is beyond about 70 to 80° C. to cause shortening of life. Therefore, the cooling of the liquid crystal cooling unit 60 should be always controlled to keep it below the above temperature.

Next, the cooling mechanism for the liquid crystal panel module 2 and the polarizing films 3 of the liquid crystal cooling unit 60 will be described. Since a cooling medium is flowing in the ring-shaped channel of the sapphire plates 61, a cooling portion of the sapphire plates 61 is cooled by the cooling medium so as to be kept lower in temperature than the liquid crystal panel module 2 and the polarizing films 3. For this reason, the heat generated by the polarizing films 3 is conducted by the sapphire plates 61 having a high thermal conductivity (about 40 W/(m·K)), to the cooling medium. Similarly, the heat generated by the liquid crystal panel module 2 is conducted by the light-transmissive highly heat-conducting substance layer 6 and the sapphire plates 61, and also conveyed to the cooling medium. Therefore, the heat generated by the liquid crystal panel module 2 and the polarizing films 3 is cooled by the cooling medium.

The temperatures of the liquid crystal panel module 2 and the polarizing films 3 are regulated to a desired level by controlling the flow velocity of the cooling medium and the intensity of the incident light.

Because the method of cooling the liquid crystal display device of the liquid crystal cooling unit 60 of Embodiment 3 is similar to that of Embodiment 1, the description therefor is omitted here.

As described above, the liquid crystal display device of Embodiment 3 brings about effects of achieving low noise, small size and high luminance because the liquid crystal panel modules 2, the polarizing films 3 on the light incident side and the polarizing films 3 on the light outgoing side of the three liquid crystal cooling units 60 are efficiently cooled with the single air cooling fan 31.

Embodiment 4

Figure 10:
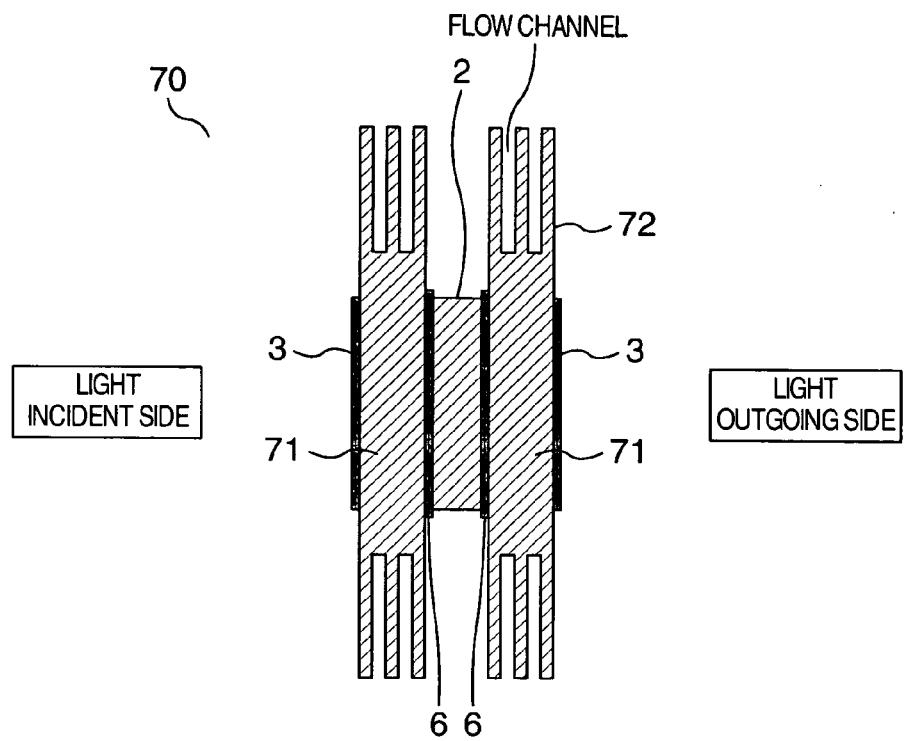
FIG. 10 is a vertical section showing a configuration of a liquid crystal cooling unit according to Embodiment 4.

FIG. 10 shows the structure of a liquid crystal cooling unit 70 of Embodiment 4.

FIG. 10 is a vertical section of the liquid crystal cooling unit 70.

Referring to FIG. 10, the liquid crystal cooling unit 70 is composed of the liquid crystal panel module 2, sapphire plates 71 each having fins 72 outside a light transmitting area and coated with the polarizing film 3, or to which the polarizing film 3 is adhered, in the light transmitting area, and the light-transmissive highly heat-conducting substance layer 6 (made of silicon grease for instance) for facilitating heat conduction between the sapphire plates 71 and the liquid crystal panel module 2.

When coating a sapphire plate 71 with the polarizing film, or adhering the polarizing film thereto, it is necessary to pay attention to the crystal axes of the sapphire plates 71 and the polarizing direction of the polarizing film 3 so that the polarizing characteristic of the polarizing film 3 is not adversely affected. Similarly, when combining the sapphire plates 71 and the liquid crystal panel module 2, it is necessary to pay attention to the crystal axes of the sapphire plates 71 and the transmitting direction of the liquid crystal panel module 2 so that the polarizing characteristic is not adversely affected. Further, the proper thickness of the sapphire plate 71 is about from 1 mm to 10 mm, while it varies according to the calorific value generated by the liquid crystal panel module 2 or the polarizing film 3. With respect to the thicknesses of the light-transmissive highly heat-conducting substance layer 6, needless to say, it is preferable that it is thin as much as possible in view of promotion of heat conduction.

When red light enters the liquid crystal cooling unit 70 from the light incident side in FIG. 10 for instance, firstly, a part of the red light which is inconsistent with the polarizing direction of the polarizing films 3 cannot be transmitted through the polarizing films 3 on the light incident side, while it is converted into heat by the polarizing films 3. The rest part of the red light transmitted through the polarizing films 3 is transmitted through the sapphire plates 71 and the light-transmissive highly heat-conducting substance layer 6, and enters the liquid crystal panel module 2. Among the part of the red light transmitted through the liquid crystal panel module 2 and the sapphire plates 71, only a part of the red light corresponding to the polarizing direction of the polarizing films 3 on the light outgoing side is transmitted, and the rest part is converted by the polarizing films 3 into heat. Also, heat is generated in the sapphire plates 71 and the light-transmissive highly heat-conducting substance layer 6 as well, due to incident loss and outgoing loss (a few percent or so of the incident light) of the red light.

Since liquid crystals of the liquid crystal panel module 2 and the polarizing films 3 include an organic substance, their optical characteristics are abruptly deteriorates if the temperature beyond roughly 70 to 80° C. to cause shortening of life. Therefore, the cooling of the liquid crystal cooling unit 70 should be always controlled to keep it below the above temperature.

Next, the cooling mechanism for the liquid crystal panel module 2 and the polarizing films 3 of the liquid crystal cooling unit 70 will be described. Since cooling air from a separately provided cooling fan is flowing between the fins 72 of the sapphire plates 71, the sapphire plates 71 are cooled by the cooling air, and they are kept lower in temperature than the liquid crystal panel module 2 and the polarizing films 3. For this reason, the heat generated by the polarizing films 3 is conducted by the sapphire plates 71 having a high thermal conductivity (about 40 W/(m·K)), to the cooling air. Similarly, the heat generated by the liquid crystal panel module 2 is conducted by the light-transmissive highly heat-conducting substance layer 6 and the sapphire plates 71, and also conveyed to the cooling air. Therefore, the heat generated by the liquid crystal panel module 2 and the polarizing films 3 is cooled by the cooling air.

The temperatures of the liquid crystal panel module 2 and the polarizing films 3 are regulated to a desired level by controlling the flow velocity of the cooling medium and the intensity of the incident light.

Because the method of cooling the liquid crystal display device of the liquid crystal cooling unit 70 of Embodiment 4 is similar to that of the prior art, the description therefor is omitted here.

As described above, the liquid crystal display device of Embodiment 4 brings about effects of achieving low noise, small size and high luminance because the liquid crystal panel modules 2, the polarizing films 3 on the light incident side and the polarizing films 3 on the light outgoing side of the three liquid crystal cooling units 70 are efficiently cooled.

Embodiment 5

Figure 11:
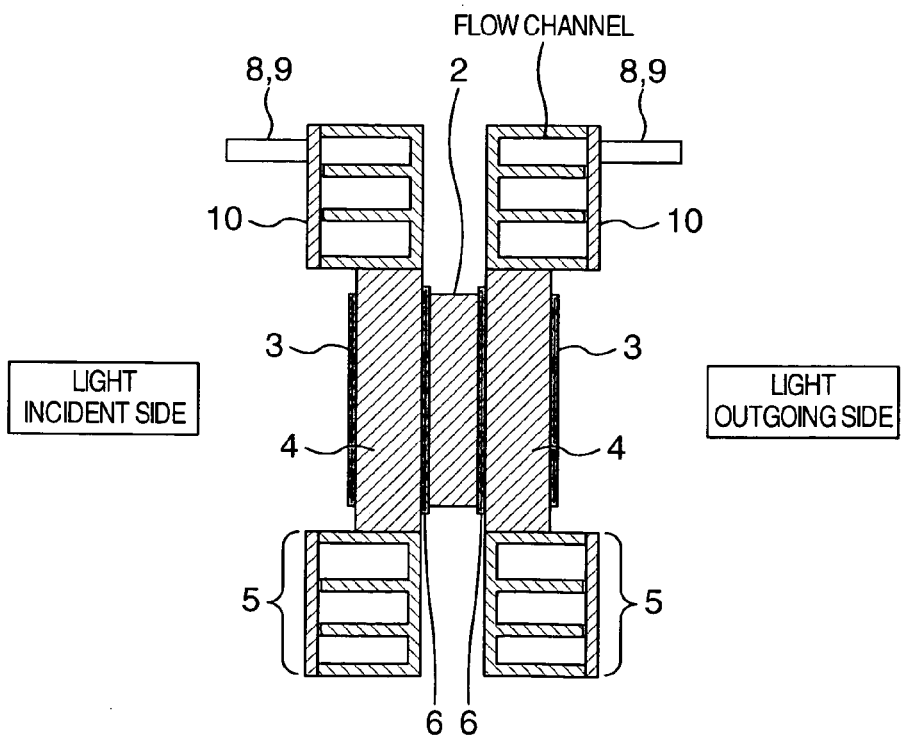
FIG. 11 is a vertical section showing a configuration of a liquid crystal cooling unit according to Embodiment 5.

FIG. 11 shows the structure of a liquid crystal cooling unit 80 of Embodiment 5.

FIG. 11 is a vertical section of the liquid crystal cooling unit 80.

The embodiment illustrated in FIG. 11 is similar in overall structure to the liquid crystal cooling unit 1 of Embodiment 1 shown in FIG. 1.

In Embodiment 5, the cooling jackets 5 are enlarged in the incident and outgoing directions of light with a view to enhancing their cooling capabilities, and this embodiment provides the same effect as Embodiment 1 even when the calorific values of the liquid crystal panel module 2 and the polarizing film 3 have increased.

Embodiment 6

Figure 12:
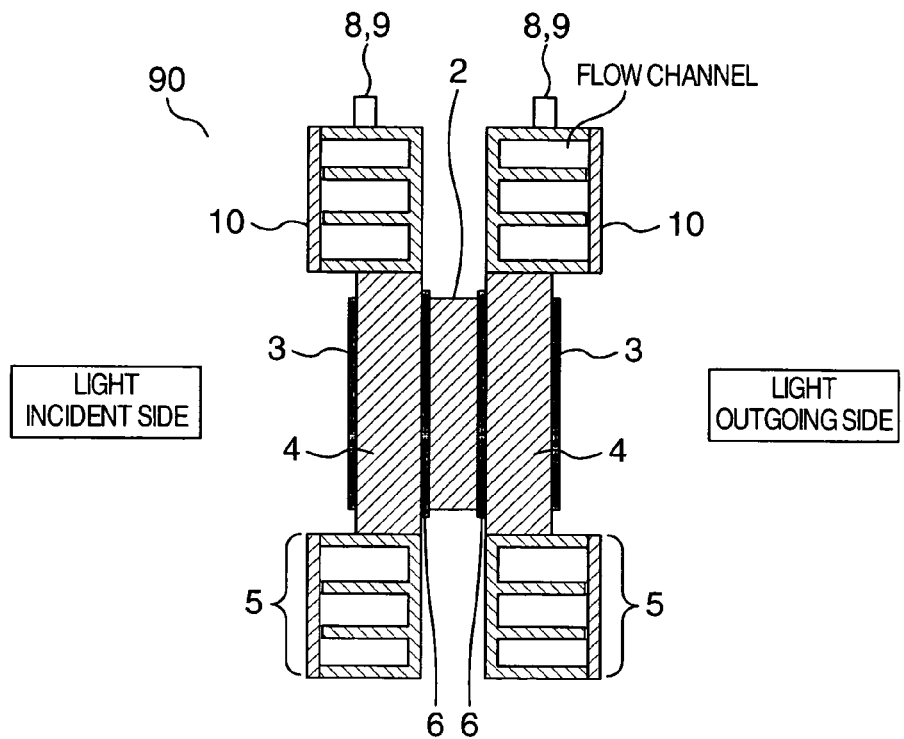
FIG. 12 is a vertical section showing a configuration of a liquid crystal cooling unit according to Embodiment 6.
Figure 13:
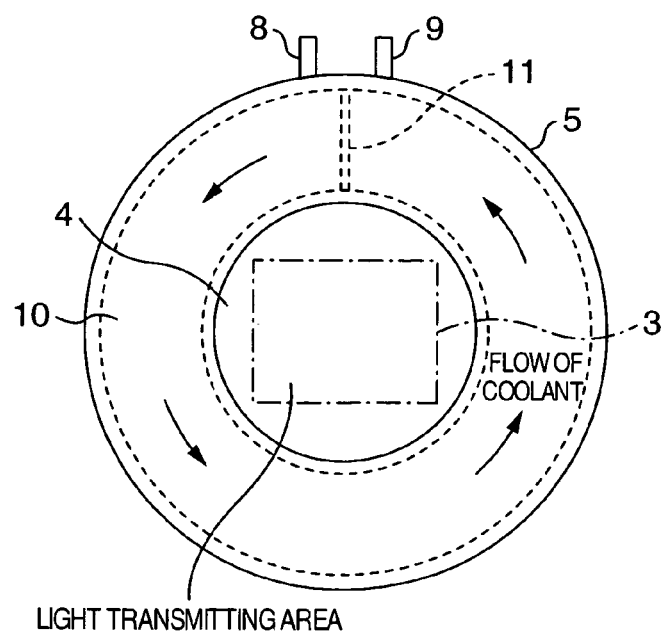
FIG. 13 is a side view of the liquid crystal cooling unit according to Embodiment 6 shown in FIG. 12.

FIGS. 12 and 13 show the structure of a liquid crystal cooling unit 90 of Embodiment 6.

This embodiment is similar in overall structure to the liquid crystal cooling unit 1 of Embodiment 1, but Embodiment 6 is enabled to provide the same effect as Embodiment 1 by arranging the inlets 8 and the outlets 9 of the cooling jackets 5 for cooling medium in the outer circumferential surfaces of the cooling jackets 5.

Embodiment 7

Figure 14:
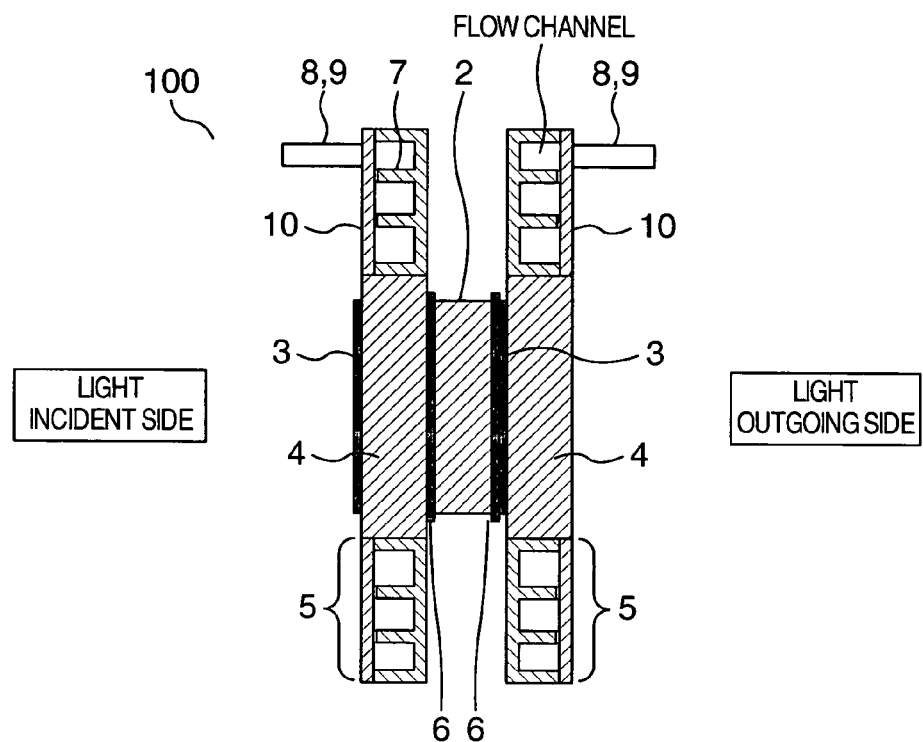
FIG. 14 is a vertical section showing a configuration of a liquid crystal cooling unit according to Embodiment 7.

FIG. 14 shows the structure of a liquid crystal cooling unit 100 of Embodiment 7.

Embodiment 7 is enabled to achieve the same effect as Embodiment 1 by disposing polarizing films 51 on the light outgoing side of the sapphire plates 4 on the liquid crystal panel module 2 side.

Embodiment 8

Embodiments of a circulating method of a cooling medium among the liquid crystal cooling unit 1, the pump 29 and the heat radiator unit 30 will be described below with reference to FIGS. 15 to 17.

Figure 15:
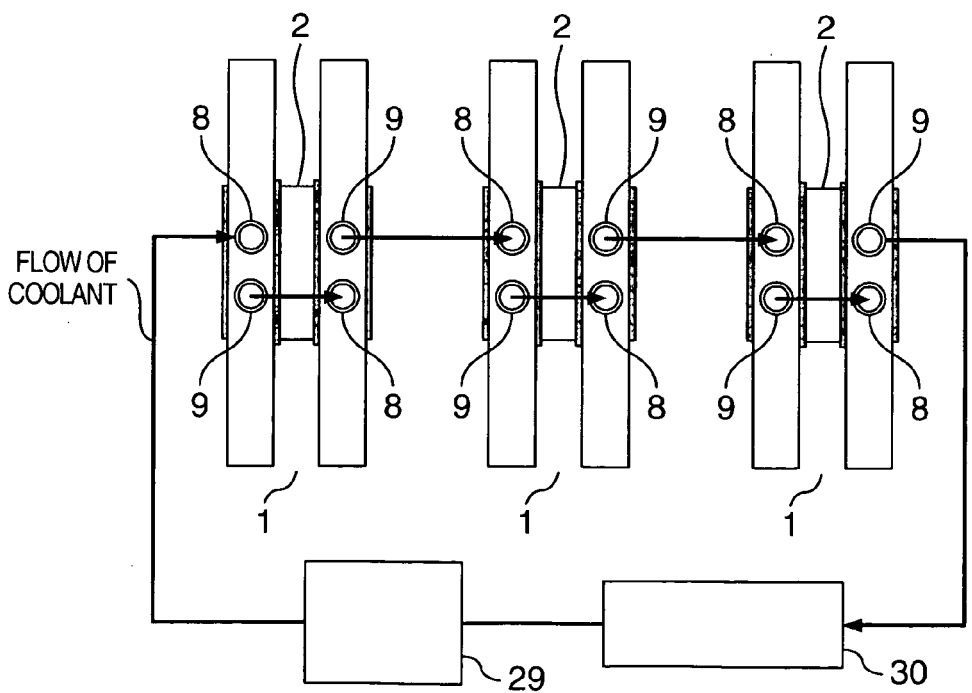
FIG. 15 illustrates a circulating system of a cooling medium.

In the embodiment shown in FIG. 15, a cooling medium is circulated to take a round through the three liquid crystal cooling units 1 by using one pump 29 and one heat radiator unit 30. While this arrangement involves no complex piping, since the temperature of cooling medium is gradually increased, it is necessary to contrive a circulation path so as to circulate the cooling medium cooled by the heat radiator unit through the three liquid crystal cooling units in descending order of calorific value, namely, through blue, green and red in this order.

Figure 16:
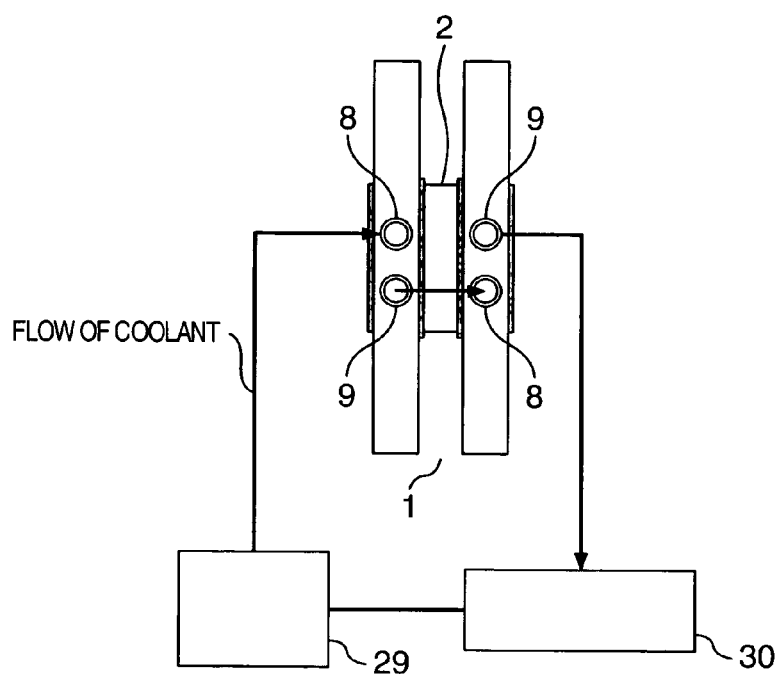
FIG. 16 illustrates the circulating system of the cooling medium.

In the embodiment shown in FIG. 16, the cooling medium is circulated by using a single pump 29 and a single heat radiator unit 30 for each of the three liquid crystal cooling units 1 shown in FIG. 15. This arrangement has an advantage of making it possible to control the cooling temperature appropriately, according to the calorific value of each of the three liquid crystal cooling units 1.

Figure 17:
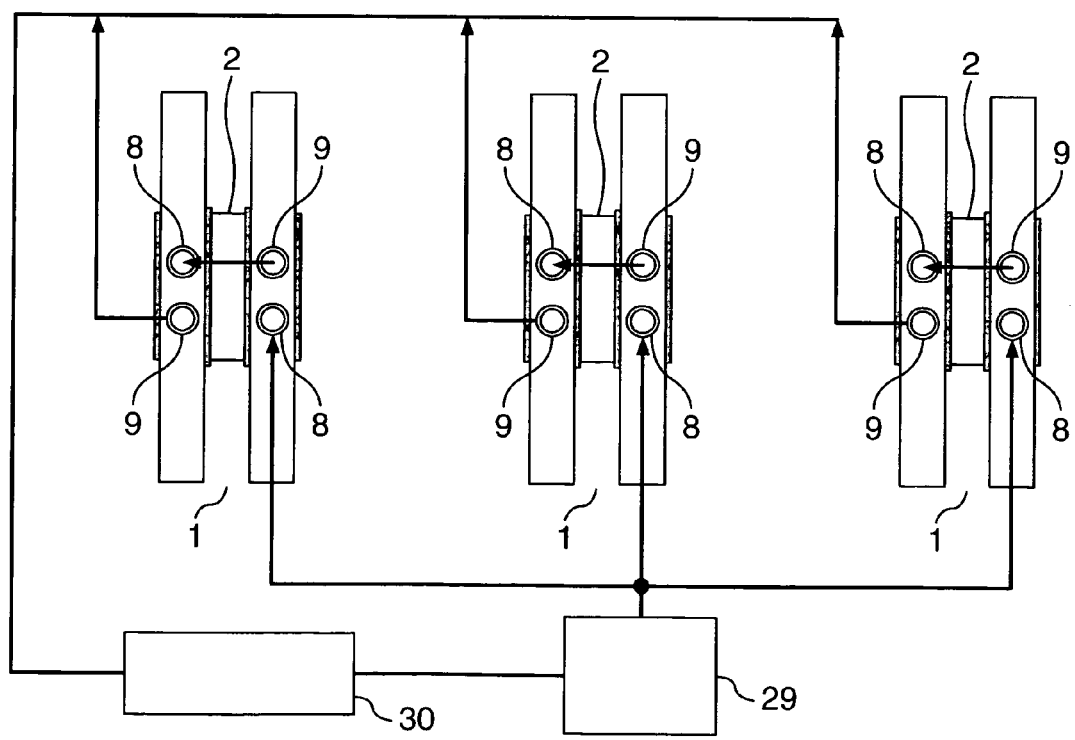
FIG. 17 illustrates the circulating system of the cooling medium.

The embodiment shown in FIG. 17 is a method in which a single pump 29 and a single heat radiator unit 30 are used to divide the cooling medium delivered from the pump 29 into three, each of which is supplied to one of the three liquid crystal cooling units 1, and after the cooling mediums circulate in the three liquid crystal cooling units 1, the cooling mediums are combined and then circulate to the pump 29 through the heat radiator unit 30. This arrangement has an advantage of making it possible to control the cooling temperature appropriately according to the calorific value of each of the three liquid crystal cooling units 1, by providing a flow velocity regulating valve or the like in the piping to regulate the allocation of the flow to be supplied to the three liquid crystal cooling units 1.

Embodiment 9

Figure 18:
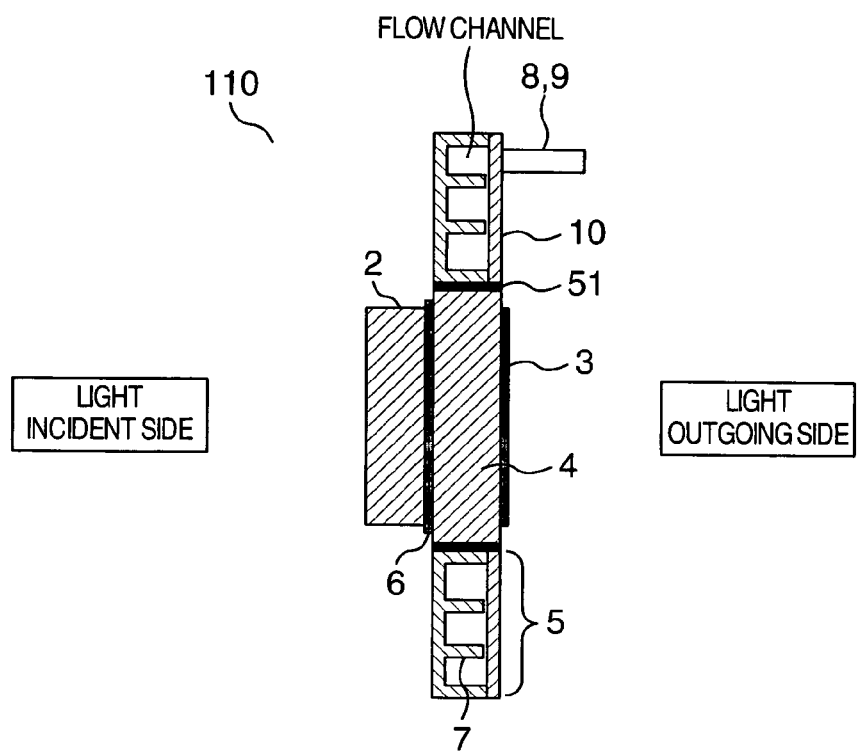
FIG. 18 is a vertical section showing a configuration of the liquid crystal cooling unit.
Figure 19:
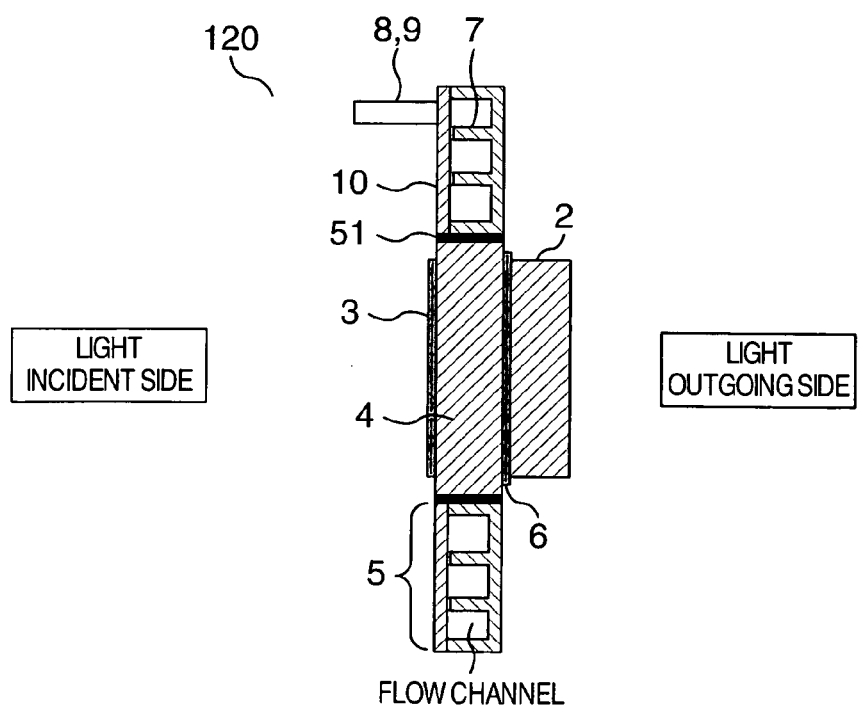
FIG. 19 is a vertical section showing a configuration of a liquid crystal cooling unit.
Figure 20:
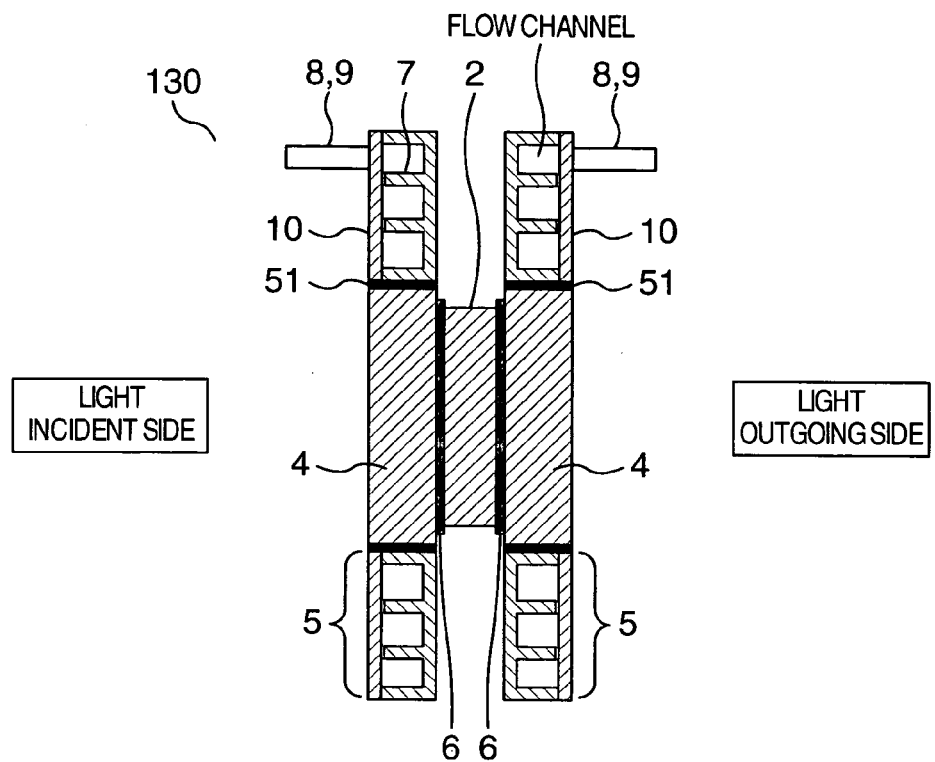
FIG. 20 is a vertical section showing a configuration of a liquid crystal cooling unit.

Although the sapphire plates 4 are arranged on both the light incident and light outgoing sides of the liquid crystal panel module 2 in Embodiments 1–7, the sapphire plate 4 may be arranged on only one side if necessary, as shown in FIGS. 18 and 19, in the case that the polarizing film 3 is arranged on only one side of the liquid crystal panel module 2, to constitute the liquid crystal cooling units 110 and 120. Further, it is not always necessary to provide the sapphire plate 4 with the polarizing film, but a liquid crystal cooling units 130 can be so configured so as to cool only the liquid crystal panel module 2 as shown in FIG. 20, if required.

Embodiment 10

Figure 21:
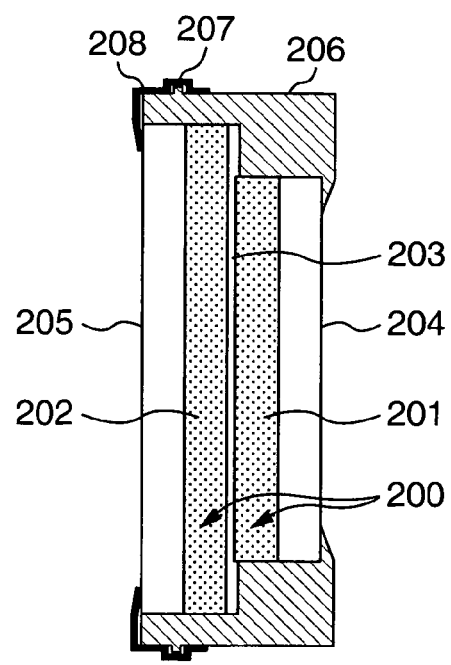
FIG. 21 is a sectional view showing the schematical structure of a liquid crystal panel module.
Figure 22:
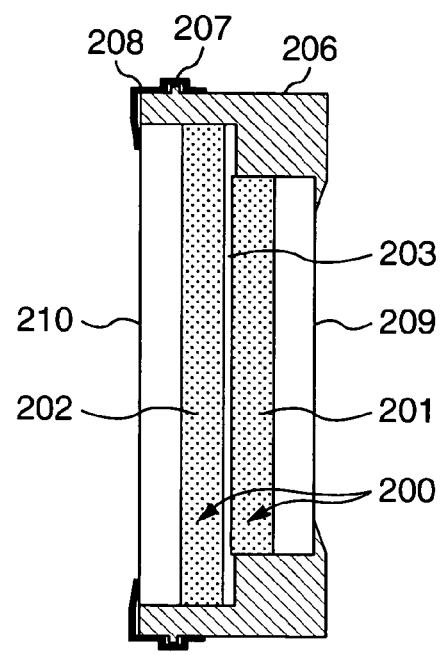
FIG. 22 is a sectional view showing the schematical structure of a liquid crystal panel module.
Figure 23:
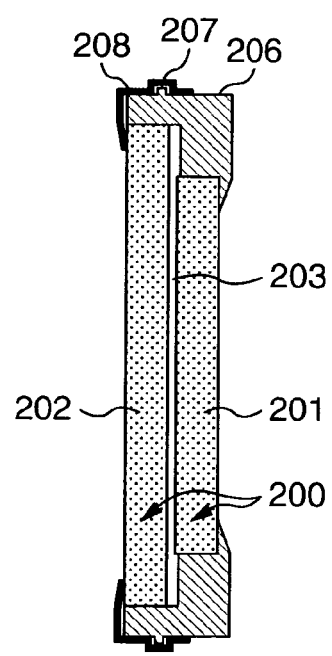
FIG. 23 is a sectional view showing the schematical structure of a liquid crystal panel module.

FIGS. 21–23 show configurations of the liquid crystal panel module 2 in this embodiment.

The liquid crystal panel module 2 shown in FIG. 21 is constructed by forming liquid crystal panels 200 by holding liquid crystals 203 between an opposed substrate 201 and an element substrate 203 and further, by holding this liquid crystal panels 200 between two transparent substrates 204 and 205 made of quartz or the like to protect the liquid crystal panels 200, to modularize a case 206, a stub 207 provided on the case, and a holding frame 208.

The liquid crystal panel module 2 shown in FIG. 22 basically has the same structure as that shown in FIG. 21, but is different in that the transparent substrates 204 and 205 are sapphire plates which are light-transmissive and highly heat-conductive ones. In that case, because the sapphire is several tens times as heat-conductive as quartz, the heat generated by the liquid crystal panel can easily escape. By configuring the liquid crystal cooling unit using this liquid crystal panel module 2, an advantage of improving the cooling capability is provided in comparison with the case of using the liquid crystal panel module having the structure shown in FIG. 21.

The liquid crystal panel module 2 shown in FIG. 23 has a structure without transparent substrates for protecting-the liquid crystal panel 200. A liquid crystal cooling unit configured by such a liquid crystal panel module 2 provides an advantage of further improving the cooling capability in comparison with the case of using the liquid crystal panel module 2 having the structure shown in FIG. 22.

Additionally, a liquid crystal cooling unit using a liquid crystal panel module having other structure or configuration described above can also provide an advantage of achieving high cooling capability, as with this embodiment.

It should be further understood by those skilled in the art that although the foregoing description has been made on the embodiments of the invention, the invention is not limited thereto and various changes and modifications may be made without departing from the spirit of the invention and the scope of the appended claims.

The invention claimed is:

1. A liquid crystal display device in which light from a light source enters a liquid crystal panel, and an image is projected from an outgoing of said liquid crystal panel, comprising:
   a heat conducting member contacted with at least one of a light incident surface and a light outgoing surface of said liquid crystal panel, so as to facilitate heat conduction in a surface direction parallel to said at least one of said light incident and light outgoing surfaces, said heat conducting member being light-transmissive and having an area larger than a light transmitting area of said liquid crystal panel; and
   a cooling jacket which comprises a flow channel for a cooling medium in its inside and is provided around said heat conducting member so that the flow channel exists only outside of said light transmitting area in said surface direction of said liquid crystal panel.

2. The liquid crystal display device according to claim 1, wherein said heat conductive member includes at least one of an incident side polarizing plate contacted with said light incident surface of said liquid crystal panel and an outgoing side polarizing plate contacted with said light outgoing surface of said liquid crystal panel.

3. A liquid crystal display device in which light from a light source enters a liquid crystal panel, and an image is projected from an outgoing side of said liquid crystal panel, comprising:
   a cooling jacket which comprises a heat conducting member contacted with at least one of a light incident surface and a light outgoing surface of said liquid crystal panel so as to facilitate heat conduction in a surface direction parallel to said at least one of said light incident and light outgoing surfaces, the heat conducting member being light-transmissive, having an area larger than a light transmitting area of said liquid crystal panel, and forming a flow channel for a cooling medium in its inside, the flow channel being formed only outside of said light transmitting area in said surface direction of said crystal panel.

4. The liquid crystal display device according to claim 1 or claim 3, wherein
   a pump for circulating the cooling medium between said cooling jacket and a heat radiator portion is connected with piping, and said heat radiator portion is cooled with air.

5. The liquid crystal display device according to claim 3, wherein said heat conductive member includes at least one of an incident side polarizing plate contacted with said light incident surface of said liquid crystal panel and an outgoing side polarizing plate contacted with said light outgoing surface of said liquid crystal panel.

6. A liquid crystal cooling unit attached to a liquid crystal display device in which light from a light source enters a liquid crystal panel, and an image is projected on a screen from an outgoing side of said liquid crystal panel, comprising:
   a heat conducting member contacted with at least one of a light incident surface and a light outgoing surface of said liquid crystal panel so as to facilitate heat conduction in a surface direction parallel to said lat least one of said light incident and light outgoing surfaces, the heat conducting member being light-transmissive and having an area larger than a light transmitting area of said liquid crystal panel; and
   a plurality of cooling fins which form a flow channel for a cooling medium in its inside and are provided around said heat conducting member so that the flow channel exists only outside of said light transmitting area in said surface direction of said liquid crystal panel.

7. The liquid crystal cooling unit according to claim 6, wherein
a polarizing film is added to a surface of said heat conducting member.

8. The liquid crystal cooling unit according to claim 6, wherein
said cooling jacket and said heat conducting member are adhered to each other with an adhesive having high thermal conductivity.

9. The liquid crystal cooling unit according to claim 8, wherein
said highly heat-conducting substance layer is made of silicon grease or a carbon sheet.

10. The liquid crystal cooling unit according to claim 9, wherein
said highly heat-conducting liquid, solid, and gel-like substance is silicon oil, silicon grease, water, water-containing liquid, or a mixture thereof, or a transparent plastic.

11. The liquid crystal cooling unit according to claim 6, wherein
said cooling jacket and said heat conducting member are in contact with each other via a highly heat-conducting substance layer.

12. The liquid crystal cooling unit according to claim 6, wherein
light-transmissive and highly heat-conducting liquid, solid, and gel-like substance intervene in a contact portion between said liquid crystal panel and said heat conducting member.

13. The liquid crystal cooling unit according to claim 6, wherein
said heat conducting member is made of sapphire or quartz.

14. The liquid crystal cooling unit according to claim 6, wherein
said cooling jacket is formed from aluminum or copper.

15. The liquid crystal cooling unit according to claim 6, wherein said heat conductive member includes at least one of an incident side polarizing plate contacted with said light incident surface of said liquid crystal panel and an outgoing side polarizing plate contacted with said light outgoing surface of said liquid crystal panel.

* * * * *